July 17, 1962  G. A. KLATCHKO  3,044,291
NONDESTRUCTIVE TESTING APPARATUS
Filed Dec. 8, 1960  2 Sheets-Sheet 1

INVENTOR.
GEORGE A. KLATCHKO
BY Harold W. Adams
ATTORNEY

July 17, 1962  G. A. KLATCHKO  3,044,291
NONDESTRUCTIVE TESTING APPARATUS
Filed Dec. 8, 1960  2 Sheets—Sheet 2

FIG. 3

INVENTOR.
GEORGE A. KLATCHKO
BY Harold W. Adams
ATTORNEY

United States Patent Office 3,044,291
Patented July 17, 1962

3,044,291
NONDESTRUCTIVE TESTING APPARATUS
George A. Klatchko, Levittown, Pa., assignor to Curtiss-Wright Corporation, a corporation of Delaware
Filed Dec. 8, 1960, Ser. No. 74,697
7 Claims. (Cl. 73—67.8)

This invention relates to a nondestructive testing apparatus and more particularly to an ultrasonic test probe assembly for inspecting journals of railroad cars.

Defective journals on railroad cars cause many costly railroad accidents. Attempts have been made to devise new, safe and fast inspection techniques for finding defective journals. Defective journals are replaced before serious damage results. One known method of non-destructively testing railroad journals employs ultrasonics.

In my co-pending U.S. patent application, Serial Number 34,074, filed June 6, 1960 and entitled "Nondestructive Testing Apparatus," now Patent 3,022,660, dated February 27, 1962, I disclose and claim an ultrasonic testing apparatus for detecting cavities, cracks, fatigue, and other defects in railroad car journals. A problem in known nondestructive testing techniques is that it is difficult to insert and mechanically lock an ultrasonic test probe in a journal box.

One reason is that railroad car journals are housed in closed journal boxes. The journals are not directly accessible even though the journal box lid is open. Also, it is difficult to insert and couple the test probe with the journal.

In my mentioned Patent 3,022,660, I have disclosed a circular probe having a plurality of transducers spaced around its periphery. In apparatus utilizing a test probe of such general character, the test probe and the transducers are magnetically coupled to the end face of the journal. The test probe rotates with the journal during the testing operation. A plurality of transducers are required to insure an inspection of the complete cross section of the journal. Because of the configuration of the journal boxes it is impossible to insert the test probe into the journal box in a straight-forward motion. Hence, the test probe cannot be easily coupled to the journal.

The test probe must be held at an angle so that the lower part of the circular test probe clears the lower lip of the journal box. Only then can the test probe be brought to the horizontal position and moved into engagement with the end face of the journal. In testing thousands of journals this operation can be costly and a serious handicap.

There are other considerations. It is difficult to lock the test probe in the journal box so that the test probe is positively supported and coupled to the end face of the journal. Also, surface irregularities on the end face of the journal makes smooth, direct contact coupling between the transducers and the journal uncertain. Unreliable tests may result.

Accordingly, it is an object of this invention to provide an ultrasonic test probe which may be used for quickly and reliably inspecting the journals of railroad cars.

Another object of this invention is to provide a test probe which may be easily inserted into the journal box and into engagement with the face of the journal in a straight-forward motion.

Yet another object of this invention is to provide a liquid couplant between the transducer and the end face of the journal to insure positive coupling therebetween.

A further object of this invention is to provide a transducer probe including one or more transducer elements which remain stationary with respect to the rotating journal so as to provide a complete scan of the entire cross section of the journal.

It is a further object of this invention to provide an ultrasonic testing apparatus in which a constant gap filled with a liquid couplant is maintained between the transducer element and the object inspected.

It is yet another object of this invention to provide a non-destructive testing apparatus for ultrasonically inspecting railroad car journals in which an ultrasonic test probe is positively locked within the journal box surrounding the journal.

Still a further object of this invention is to provide ultrasonic testing apparatus for inspecting journals including means for supplying liquid couplant to the face of the journal under pressure which liquid couplant is also employed to control a locking means for securing the ultrasonic test proble assembly within the journal box.

In general my invention may include an ultrasonic test probe having one or more transducer elements mounted in the face thereof. The test probe may be substantially rectangular in cross section so that it may be inserted directly into the journal box in a straight-forward motion. The test probe is provided with a center finder pin which cooperates with a center hole formed in the journal to positively locate a transducer element with respect to the end face of the journal. A liquid couplant such as oil is forced under pressure into a gap between the transducer element and the face of the journal formed by a spacing and sealing assembly mounted around the transducer element.

The oil is forced under pressure into the gap between the transducer element and the journal face through a pressure control valve. A holding finger is provided and is actuated by the pressure of the liquid couplant to lock the test probe in the journal box.

The control valve admits oil under pressure into the gap only when the holding finger is in the locking position. When the testing operation is finished, the holding finger is released and the test probe easily withdrawn from the journal box.

Other objects and advantages of my invention will become apparent from the following description when taken in view of the accompanying drawings in which:

FIGURE 3 is a sectional view of an embodiment of my invention illustrating an alternative holding means for locking a transducer probe within a journal box.

Figure 1:
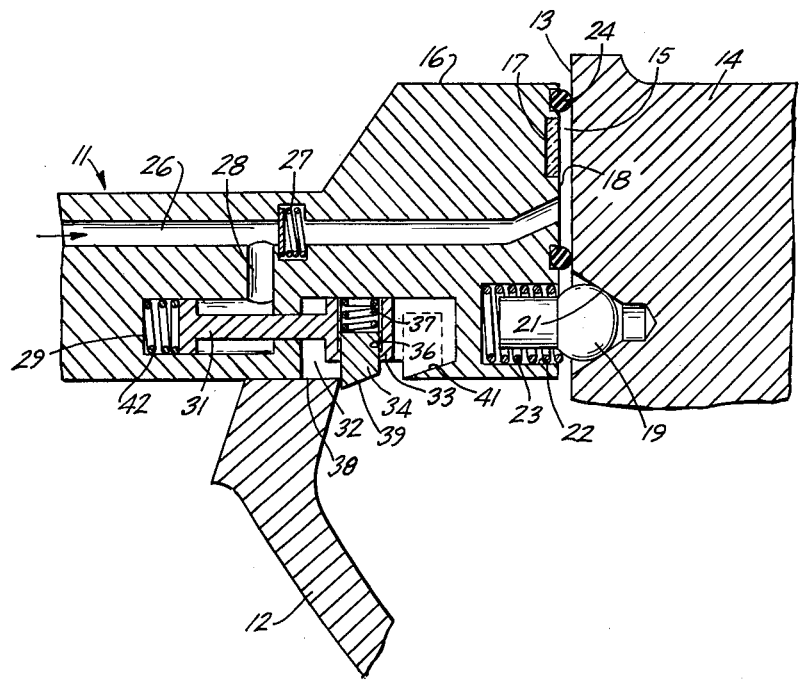
FIGURE 1 is a sectional view of an apparatus in accordance with my invention showing a transducer probe coupled to the end face of a journal and securely locked within a journal box housing the journal.

Referring now to FIG. 1, a test probe assembly 11 is shown supported in a journal box 12 against the end face 13 of a railroad car journal 14. The test probe assembly 11 is only partially shown in cross section for purposes of clarity. A head portion 16 of the test probe assembly 11 is substantially rectangular in cross section. A transducer element 17 is mounted in a substantially flat end face 18 of the head portion 16.

A center finder pin 19 cooperates with a countersunk guide hole 21 formed in the center of the journal 14 to locate the transducer probe assembly 11 with respect to the end face 13 of the journal 14. The center finder pin is mounted in an aperture 22 in the head portion 16 and forced outwardly by a compression spring 23 secured in the aperture 22 and to the pin 19.

The head portion 16 is spaced from the end face 13 of the journal 14 by a garter spring and tube assembly 24 such as that described in my co-pending application entitled "Ultrasonic Scanning Head," Serial Number 72,-

908 filed December 1, 1960. The garter spring and tube assembly spaces the head portion 16 from the end face 13 maintaining a constant and sealed gap 15 around the transducer 17.

A suitable liquid couplant such as oil is forced into the gap 15 under pressure through a passageway 26 extending completely through the test probe assembly 11. A pressure control valve 27 restricts the passageway 26 between the source of oil and the gap 15. A by-pass passageway 28 extends between the passageway 26 and a cylinder 29 having a piston 31 reciprocally mounted therein. The passageway 28 is ahead of the pressure safety control valve 27. A normally open discharge valve 25 (FIG. 2) connects the cylinder 29 to an oil return line 40.

The piston 31 extends through the cylinder 29 into a recess 32 formed in the head portion 16. A cylindrical end portion 33 receives a spring loaded holding finger gagement with the lower lip 38 of the journal box 12. In 34 in a bore 36 in the end portion 33. As shown in FIG. 1 the holding finger 34 is forced downwardly in the bore 36 by a compression spring 37 forcing it into enthis position the spring loaded center finding pin 19 and the holding finger 34 lock the test probe assembly 11 in the journal box 12 in an operative relationship with the journal 14.

The holding finger 34 is provided with a cam surface 39 and a cam surface 41 is formed on the head portion 16. The two cam surfaces 39 and 41 cooperate to force the holding finger 34 into the aperture 36 against compression spring 37 when the piston 31 is in a forward position. In this position the test probe assembly 11 is easily removed from the journal box 12 in a straight-forward motion. The piston 31 is normally held in the forward position by a spring 42 mounted in the cylinder 29.

Figure 2:
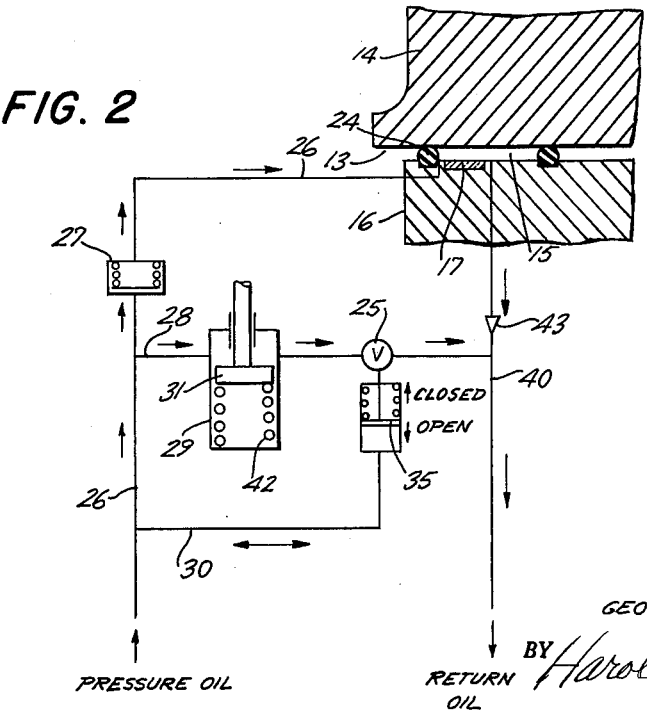
FIGURE 2 is a schematic of the hydraulic system of my invention.

FIG. 2 shows the hydraulic system of my invention. It can best be described by describing the operation of my invention. Referring now to FIGS. 1 and 2, assume the journal 14 is to be inspected. The transducer probe assembly 11 is inserted into the journal box 12 in a straight-forward motion until the center finder pin 19 is positioned in the counter sunk guide hold 21 in the journal 14. At this point the piston 31 is held in the forward position by the spring 42 and the holding finger 34 is withdrawn. A liquid couplant such as oil is then forced into the passage 26 under pressure against the pressure control valve 27.

The oil pressure increases in a control line 30 opening into the passage 26 to actuate a spring tensioned piston 35 connected to the normally open valve 25 to close the valve 25. Control valve 27 resists the oil pressure and diverts the oil through the passageway 28 into the cylinder 29. As the oil pressure builds up in the cylinder 29 the piston 31 is withdrawn against the compression spring 42 sliding the holding finger 34 over the cam surface 41. The cylinder 31 is retracted until the holding finger 34 clears the cam surface 41. At that point the spring 37 forces the holding finger 34 out of the aperture 36 downwardly in the bore 36 into a holding position.

The holding finger 34 engages the lower lip 38 of the journal box 12 to rigidly support and lock the test probe assembly 11 in the journal box 12. The head portion 16 is properly positioned with respect to the end face 13 of the journal 14. The garter spring and tube assembly 24 spaces the transducer 17 from the journal 14, forming a sealed, uniform gap between the transducer and the end face 13 of the journal 14.

When sufficient pressure builds up in the cylinder 29 to provide the desired holding action continued pressure opens the pressure control valve 27 admitting oil into the gap 15 to couple the transducer 17 with the journal 14. At this point the ultrasonic inspection may be made. Ultrasonic testing techniques are well known and need not be described in detail.

By way of suitable electrical connections not shown the transducer 17 is pulsed causing a beam of ultrasonic vibrations to be transmitted into the journal 14. A single transducer 17 scans the entire cross section of journal 14 when the journal is rotated with respect to the test probe assembly 11. As the test probe is designed to test the journals of moving cars this action occurs.

The ultrasonic vibrations penetrate the journal 14 and those vibrations striking defects or cavities in the journal are reflected back to the transducer 17 where they are received and converted into electrical signals. The electrical signals are taken from the transducer element through suitable circuitry not shown and utilized using conventional circuitry to indicate the presence of any faults or defects within the journal. A commercially available test set for nondestructively testing railroad axles as here described is the Curtiss-Wright Echometer Railroad Journal Test Set Model TS602 manufactured by the Curtiss-Wright Corporation.

When the test is completed, the oil pressure in the passage 26 is cut off. This closes the pressure safety control valve 27, cutting off further oil supply to the gap 15. The spring tensioned piston 35 now opens the closed valve 25. The oil in the gap 15 and passageway 26 between the control valve 27 and the gap is returned through the return line 40 to a sump not shown. A check valve 43 in the return line 40 prevents oil discharged from the cylinder 29 from entering the gap 15.

The compression spring 42 forces the piston 31 against the oil now in the cylinder 29 forcing it out the now open discharge valve 25 into the passage 40 where it is returned to the oil supply tank. When the piston 31 is returned to its forward position the holding finger 34 is in a withdrawn position. The test probe assembly 11 may be easily removed from the journal box 12 in a straight-rearward motion. The test probe assembly 11 is now ready for a next testing operation.

Thus my invention provides a holding means for positively locking the transducer probe 11 within the journal box. The oil not only actuates the holding means but also couples the transducer 17 to the journal 14.

Referring now to FIG. 3 an alternative embodiment of my invention is shown. In this arrangement a test probe assembly 111 is positioned within a journal box 112 as previously described. A spring loaded center finding pin 119 cooperates with a counter sunk guide hole 121 in the journal face 113 to properly position a transducer 117 with respect to the end face 113. A garter spring and sleeve assembly 124 encircles the transducer 117 and creates a sealed uniform gap 115 between the transducer 117 and the end face 113.

A suitable lubricant such as oil is admitted into the gap through a passageway 126 which is restricted by a safety control valve 127. A return line 140 connected to the gap returns the oil to a sump not shown. A passage 128 extends between the passage 126 into a cylinder 129 having a reciprocal piston 131 mounted therein. Oil in the cylinder 129 is returned to a passage 149 through a spring tensioned normally open discharge valve 125. In operation oil is forced under pressure into the passage 130 to close the discharge valve 125 forcing oil through the passage 128 into the cylinder 129. As the pressure builds up in the cylinder 129 it forces the piston 131 toward the right against a return spring 142.

As the piston 131 moves toward the right a rack 43 formed on the piston 131 engages a pinion gear 44 mounted on a rotatable shaft 46 secured to the head portion 116. The rack 43 turns the pinion gear 44 to rotate the shaft 46 and pivot a holding finger 47 mounted on the shaft 46 into engagement with a lower lip 138 of a journal box 112. The piston 131 moves the right until the holding finger 47 securely locks the test probe assembly in the journal box 112 as shown in FIG. 3. As the pressure continues to build up it opens the control valve 127, admitting oil under pressure into gap 115.

The journal 114 can now be ultrasonically inspected. When the test is completed the oil pressure in the passage 126 is cut off, closing the control valve 127 opening the spring tensioned discharge valve 125. Oil is returned to a sump from the gap 115 through a return line 140. The spring 142 moves the piston 131 to the left forcing the oil in the cylinder 129 through the open discharge valve 125 into the return line 149 and back to a reservoir.

As the piston 131 moves to the left the holding finger 47 is returned to a nonholding position shown in dotted lines in FIG. 3. The test probe assembly 111 can then be easily withdrawn from the journal box 112 in a straight-rearward motion and a next testing operation performed.

Although I have described by invention in detail it will be appreciated that many changes and modifications may be made by those skilled in the art without departing from the spirit of my invention which is to be limited only by the scope of the appended claims.

I claim:

1. Ultrasonic apparatus for nondestructively testing a railroad car journal housed in a journal box comprising an ultrasonic test probe including transducer means mounted therein, spacing and sealing means on said test probe for forming a sealed gap between said transducer means and said journal when said spacing and sealing means engage said journal, holding means mounted on said test probe for locking said test probe in said journal box whereby said spacing and sealing means engage said journal forming said sealed gap, hydraulic means for actuating said holding means and for admitting hydraulic fluid into said gap, and means actuated by said hydraulic means for admitting said hydraulic fluid into said gap after said hydraulic means actuates said holding means.

2. Apparatus for nondestructively testing a railroad car journal housed in a journal box which comprises, an ultrasonic test probe including transducer means mounted therein, a movable holding finger secured to said test probe for locking said test probe in said journal box, and hydraulic means for moving said holding finger between a locking and nonlocking position, said hydraulic means comprising a cylinder having a reciprocal piston mounted therein; said piston arranged to move said holding finger between said locking and nonlocking positions, and fluid under pressure for actuating said piston.

3. Apparatus as defined in claim 2 wherein said fluid is forced between said transducer means and said journal after said holding finger is moved to said locking position.

4. Apparatus as defined in claim 2 wherein said holding finger reciprocates between said locking and nonlocking positions.

5. Apparatus as defined in claim 2 wherein said holding finger pivots between said locking and nonlocking positions.

6. Apparatus for nondestructively testing journals of a railroad car which comprises an ultrasonic test probe including transducer means mounted therein; spacing and sealing means on said test probe for forming a sealed gap between said transducer means and said journal when said spacing and sealing means engage said journal; a passageway in said test probe connecting said gap with a source of fluid under pressure; a pressure control valve in said passageway; a cylinder formed in said test probe; a passageway connecting said cylinder with said source of fluid under pressure; a movable piston supported in said cylinder; a holding finger secured to said piston; a spring associated with said piston for urging said holding finger in a locking position when said piston is withdrawn in said cylinder; and cam means formed on said test probe for holding said holding finger in a nonlocking position when said piston is in a forward position whereby said fluid under pressure withdraws said piston to move said holding finger into a locking position and said control valve admits said fluid into said gap when said holding finger is in a locking position, said spring returning said holding finger to said nonlocking position when said fluid pressure is removed.

7. Apparatus for nondestructively testing the journals of railroad cars housed in journal boxes comprising a test probe including transducer means mounted therein; spacing and sealing means on said probe for forming a sealed gap between said transducer means and said journal; a passageway connecting said gap with a source of fluid pressure; a cylinder formed in said test probe; a movable piston mounted in said cylinder; a passageway connecting said cylinder to said source of fluid pressure; a recess formed in said test probe, a portion of said piston extending through said cylinder into said recess; a rack formed on said portion of said piston; a shaft connected to said test probe and extending through said recess, said shaft being rotatably mounted; a pivotable holding finger mounted on said shaft; a pinion formed on said shaft engaging said rack formed on said portion of said piston; and a spring supported in said recess in engagement with said piston whereby fluid under pressure entering said cylinder forces said piston against said spring causing said rack to rotate said pinion to pivot said holding finger between a nonlocking and locking position to lock said test probe within said journal box; and a control valve in said first passageway for admitting said fluid into said gap when said holding finger is moved to said locking position.

References Cited in the file of this patent

UNITED STATES PATENTS 2,592,134     Firestone _____ Apr. 8, 1952